July 17, 1928.                               1,677,212
L. ROUANET
FIXED SUPPORT FOR SPARE WHEELS
Filed July 28, 1926          3 Sheets-Sheet 1
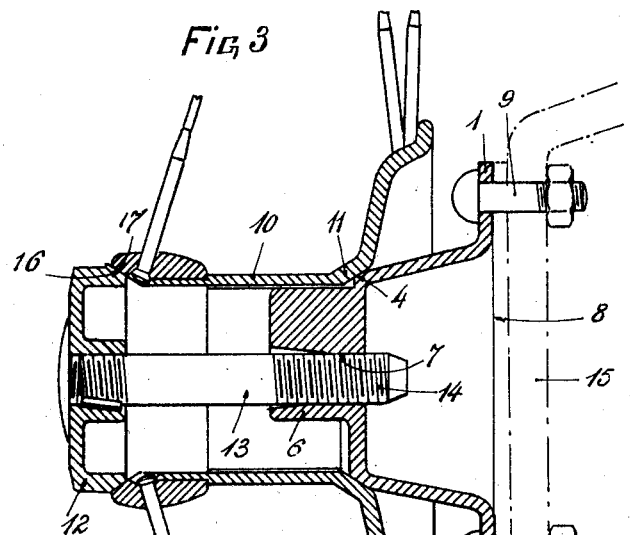
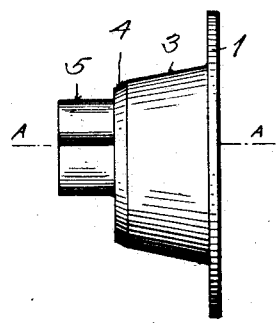
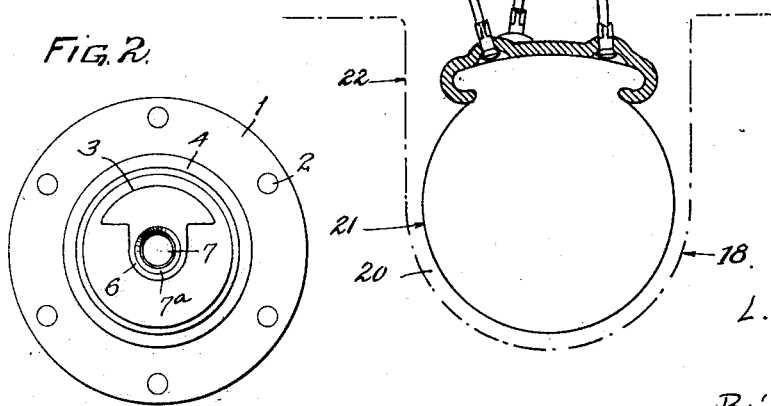
L. Rouanet
inventor
By: Marks & Clerk
Attys.

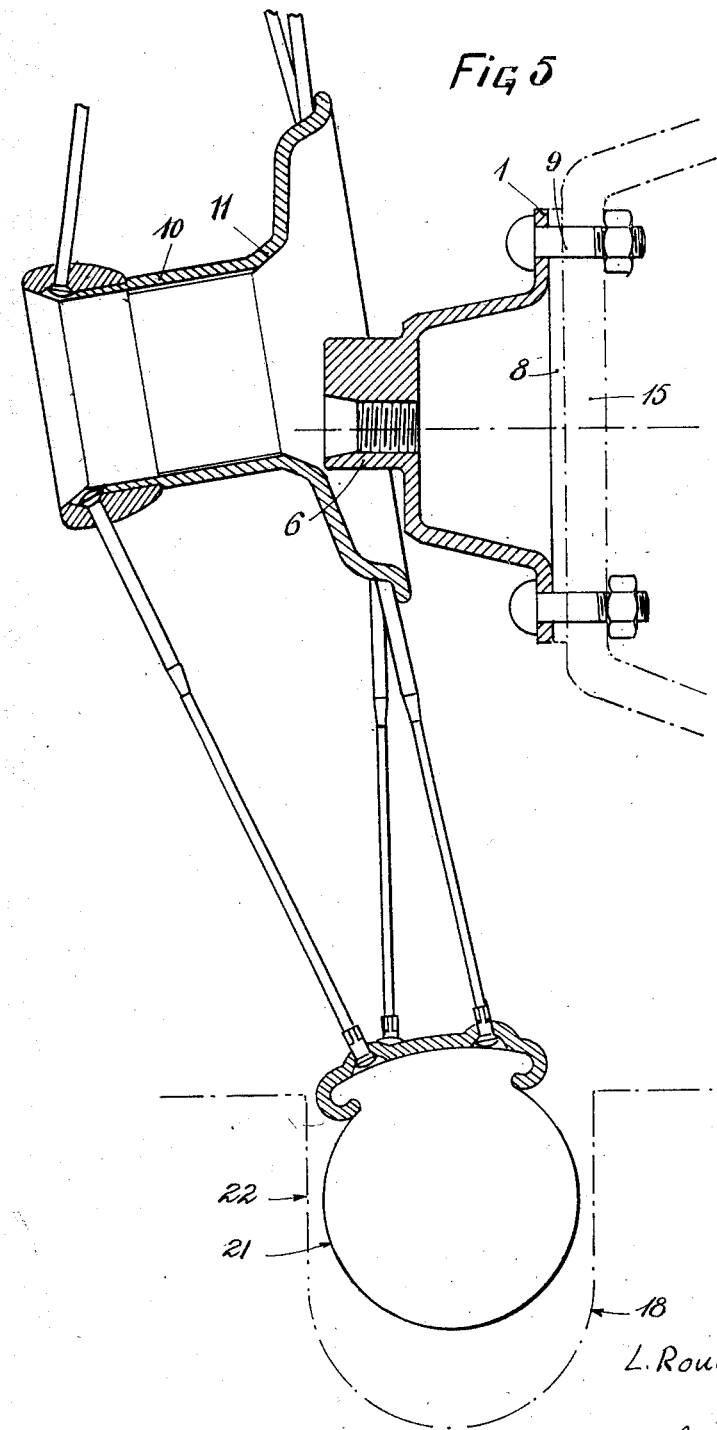

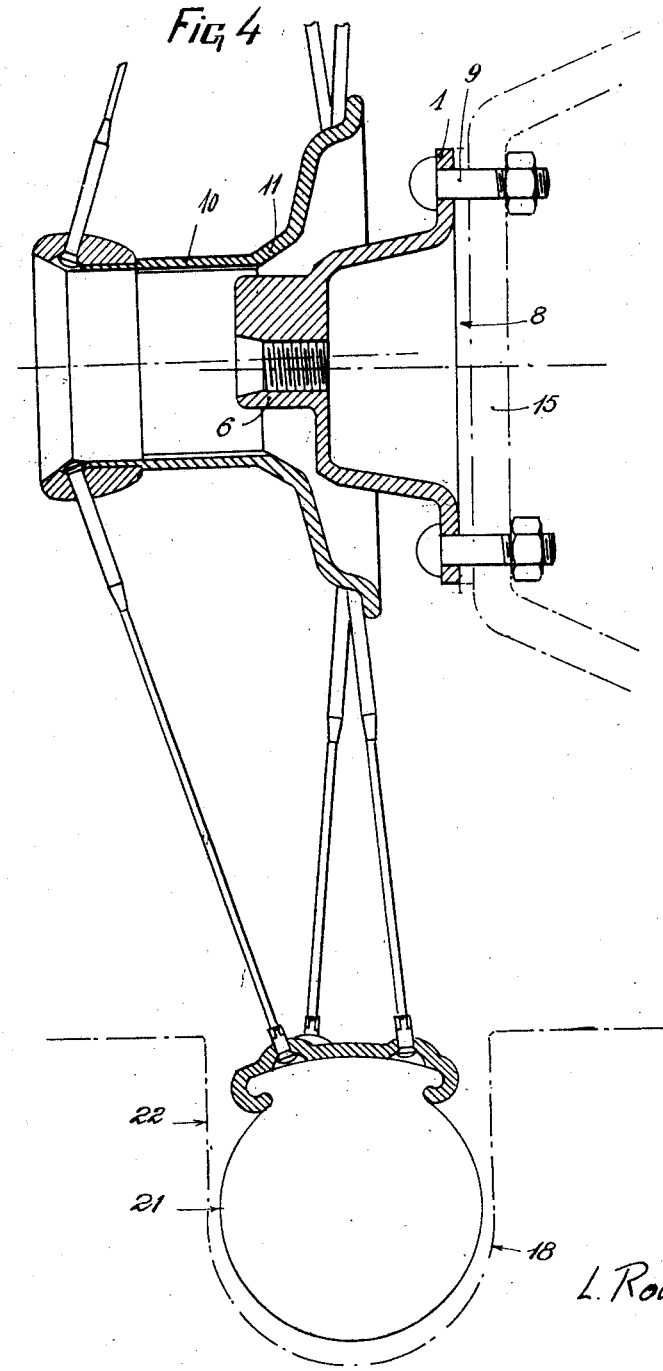

Patented July 17, 1928.

1,677,212

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY.

FIXED SUPPORT FOR SPARE WHEELS.

Application filed July 28, 1926, Serial No. 125,505, and in France August 22, 1925.

The object of the present invention is to provide a fixed support for removable vehicle wheels of the type in which an exterior removable hub part is mounted as a sleeve on a permanent interior hub part, the said two hub parts having to rotate as a whole. In this type of wheel, the exterior part is fastened on the interior part by means of a central nut.

The fixed support according to the invention, which enables the spare wheel to be placed as desired either on a running board, in an ordinary cup shaped member, or in a cup shaped member inserted into a mud guard, as well as on all types of bodies presently in use, and comprises in combination, an exterior truncated conical part on which the interior truncated conical part of the spare wheel hub seats, and a part called the "rest part", is characterized in that the "rest part" fills only a portion of a cylinder, enabling it to be made with a very great length without interfering in any way with the operations performed in putting the spare wheel in place on the support or removing it from the latter, in the case of application to a vehicle with a cup shaped receiving member.

In the special case of application of the support to a vehicle of the type comprising a cup shaped receiving member, the mounting of a wheel is obtained by first tilting the said wheel so as to engage it in the cup, and then swinging and sliding it so that its hub engages the "rest part" of the support. The wheel is afterward forced home until the interior truncated conical part of the wheel hub comes into contact with the corresponding exterior truncated conical part of the support. Finally, the wheel is secured on the support in known manner by screwing up a central locking nut provided with a long threaded stud.

The invention will be better understood with reference to the accompanying drawings, given as example, in which:

Fig. 1 is a longitudinal elevation of the support;

Fig. 2 is a front end view of the support;

Fig. 3 is a longitudinal section of the support showing its application to a vehicle having a cup shaped receiving member;

Figs. 4 and 5 are views similar to that of Fig. 3, showing the method of removing the spare wheel.

The fixed support in one piece either cast or machined, that is shown in Figs. 1 and 2, has, from right to left, a flange 1 provided with holes 2 for the bolts used for securing the support to the vehicle body, a cylindrical, conical or otherwise shaped part 3, a truncated conical bearing surface 4, corresponding to the interior truncated conical part of the wheel to be supported, and a cylindrical part 5 called the "rest part", of considerable length but occupying a sector less than 180 degrees. Said sector is moreover above the axis A of the support, so as to enable the latter to be applied to vehicles of the type having a cup shaped receiving member, as will be explained hereafter.

Below its axis, and along the entire axial length of the rest part, the support is provided with a semi-tubular part 6, of small diameter suitably attached to the rest part and axially bored with a threaded hole 7 chamfered at 7$^a$.

Fig. 3 shows the support attached to the body of a vehicle through the intermediary of a plate 8 and a forked bracket 15, by means of bolts 9 extending through the holes 2 in the flange 1.

The spare wheel is engaged on the support by its hub 10, the interior truncated conical part 11 of the hub 10 seating on the corresponding truncated conical part 4 of the said support. A cap nut 12 provided with a long stud 13, threaded at its end 14 for screwing into the threads 7 formed inside the semi-tubular part 6, centers the spare wheel on the support by means of a tapered or conical bearing surface 16, corresponding to a tapered or conical bearing surface 17 at the front end of the hub 10. The spare wheel is thus pressed by its hub 10 between tapered or conical bearing surfaces, i. e. the surface 4 on the support body and the surface 16 on the cap nut 12. In this figure it is seen that the lower part of the wheel mounted on the support is engaged in a cup 18.

Figs. 4 and 5 illustrate the method of removing the spare wheel from its support, as applied to a vehicle of the type with a cup shaped receiving member, as shown in Fig. 3. In said figures, it is assumed that the cap nut 12, the threaded end 14 of which was engaged in the threads 7 in the support, is removed. Notwithstanding it would be impossible to remove the wheel by simply moving it parallel to the axis, on account of the fact that the wheel is engaged in the hub 18.

To remove the wheel it is first necessary to raise it by sliding it on the truncated conical bearing surface 4 of the support (Fig. 4), and then to continue to raise it while increasing the inclination until it may be disengaged (Fig. 5).

If the rest part 5 were cylindrical, it is evident that it would be absolutely impossible to raise the wheel, the removal of the latter not being possible unless the axial length of the rest part 5 is less than the play between the tyre 21 and the face 22 of the cup 18.

Obviously this support may be conveniently applied to all types of vehicle bodies, and its use is not limited to the vehicles provided with a cup receiving member.

Claims:

1. A fixed support for spare wheel, having a truncated conical part for centering the wheel and a rest part, characterized by the fact that the cross section of the said rest part is an arc of a circle situated above the horizontal plane containing the axis of the said support and of which the angle subtended at the center is less than 180 degrees, so as to enable the said rest part to be formed with a substantial axial length while permitting the use of the support on a vehicle of the type having a cup shaped receiving member for the wheel.

2. A support according to claim 1, characterized by the fact that the said rest part is slightly tapered.

3. A support according to claim 1, comprising an assembling threaded stud screwing into the said support, a cap at the end of said stud and bearing against the outside face of the wheel hub, both the bearing surface on the said cap and the outside face of the hub having the shape of a truncated cone.

4. A support according to claim 1, comprising an assembling threaded stud screwing into the said support, and a chamfered part on the threaded hole receiving the said stud.

LOUIS ROUANET.